(12) United States Patent
Wong et al.

(10) Patent No.: US 11,152,866 B2
(45) Date of Patent: Oct. 19, 2021

(54) ACTIVE CLAMPING FLYBACK CIRCUIT AND CONTROL METHOD THEREOF

(71) Applicant: Joulwatt Technology (Hangzhou) Co., Ltd., Hangzhou (CN)

(72) Inventors: Pitleong Wong, Hangzhou (CN); Xianghua Jiang, Hangzhou (CN); Xunwei Zhou, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 0 days.

(21) Appl. No.: 16/714,639

(22) Filed: Dec. 13, 2019

(65) Prior Publication Data
US 2021/0058002 A1 Feb. 25, 2021

(30) Foreign Application Priority Data
Aug. 21, 2019 (CN) .......................... 201910772897.2

(51) Int. Cl.
*H02M 3/335* (2006.01)
(52) U.S. Cl.
CPC ............... *H02M 3/33592* (2013.01)

(58) Field of Classification Search
CPC .............................................. H02M 3/335–42
See application file for complete search history.

(56) References Cited

U.S. PATENT DOCUMENTS

| | | | |
|---|---|---|---|
| 2014/0307484 A1* | 10/2014 | Yang | H02M 3/33569 363/21.12 |
| 2019/0058450 A1* | 2/2019 | Jun | G01R 19/04 |

* cited by examiner

*Primary Examiner* — Peter M Novak
(74) *Attorney, Agent, or Firm* — Treasure IP Group, LLC

(57) ABSTRACT

An active clamping flyback circuit and a control method are disclosed, comprising a flyback circuit, a clamping circuit and a clamping control circuit. The active clamping flyback circuit comprises a transformer, a main transistor, and a freewheeling diode or a synchronous rectifier, an output feedback circuit is coupling to an auxiliary winding of the transformer and outputs a feedback voltage through a divided voltage The clamping circuit comprises a first capacitor and a first transistor coupling in series, In a discontinuous conduction mode, the clamping control circuit starts timing from a turn-off time of the first transistor, and ends timing until the feedback voltage is reduced to zero voltage, to obtain a first time, The clamping control circuit adjusts a turn-off moment of next switching cycle of the first transistor so that the first time of the next switching cycle is close to a first threshold.

10 Claims, 4 Drawing Sheets

*- Prior Art -*

ACTIVE CLAMPING FLYBACK CIRCUIT AND CONTROL METHOD THEREOF

CROSS-REFERENCE TO RELATED APPLICATION

This application claims priority to the Chinese Patent Application No. 201910772897.2, filed on Aug. 21, 2019, entitled "Active Clamping Flyback Circuit And Control Method Thereof", which is incorporated herein by reference in its entirety in this disclosure.

BACKGROUND OF THE DISCLOSURE

Field of the Disclosure

The present disclosure relates to the technical field of power electronics technology, and more particularly, to an active clamping flyback circuit and a control method thereof.

Description of the Related Art

As shown in FIG. 1, an active clamping flyback circuit is shown, which is a flyback circuit coupling to a clamping circuit and a clamping control circuit, the clamping circuit comprises a first capacitor and a first transistor coupling in series, one end of the first capacitor is coupling to a high voltage end of an input voltage, one end of the first transistor is coupling to a common end of a main transistor and a primary winding of a transformer. When the main transistor turns off, instantaneous spikes and high secondary harmonics at a drain terminal of the main transistor are capacitively coupled to a power supply. Clamping the drain voltage Vdssw of the main transistor reduces the that turn-off loss of the main transistor and improves system efficiency.

When system is operating in a discontinuous conduction mode (DCM), the first transistor is off in advance, which may cause the drain voltage Vdssw of the main transistor be dropped and restored, consequently causing energy loss and the system efficiency decrease. On the other hand, delaying turn-off may cause severe oscillation, or insufficient transmission of energy of this cycle, consequently decreasing the system efficiency, even causing operation failure. Therefore, how to control the first transistor to be off when current of primary winding of the transformer reaches zero is an urgent problem to be solved in the flyback active clamping circuit operating in the discontinuous conduction mode.

BRIEF DESCRIPTION OF THE DISCLOSURE

In view of this, an objective of the disclosure is to provide an active clamping flyback circuit and a control method thereof, so as to solve the problem in the prior art that the first transistor is off in advance or delayed so that causing voltage drop or dip in the drain voltage of the main transistor, so that causing energy loss and reducing system efficiency.

According to a first aspect of the present disclosure, an active clamping flyback circuit is provided. The active clamping flyback circuit comprises a flyback circuit, a clamping circuit and a clamping control circuit. The flyback circuit comprises a transformer, a main transistor, and a freewheeling diode or a synchronous rectifier, wherein an output feedback circuit is coupling to an auxiliary winding of the transformer and outputs a feedback voltage through a divided voltage. The clamping circuit comprises a first capacitor and a first transistor coupling in series, one end of the first capacitor is coupling to a high voltage end of an input voltage, one end of the first transistor is coupling to a common end of the main transistor and a primary winding of the transformer. When the active clamping flyback circuit operates in a discontinuous conduction mode, the clamping control circuit starts timing as soon as the first transistor is off, and ends timing until the feedback voltage is reduced from positive voltage to zero voltage, wherein time elapsed for the timing is defined as a first time. And the clamping control circuit adjusts a turn-off time of next switching cycle of the first transistor, so that the first time of the next switching cycle is configured to be substantially, the same as a first threshold.

Optionally, the first threshold is a quarter of an oscillation period of an oscillation, which is a voltage oscillation occurring at the drain terminal of the main transistor. The oscillation is generated based on a sum inductance of a magnetizing inductance and a leakage inductance of the transformer (Lm+Lk) and a sum capacitance of a drain-source parasitic capacitance of the first transistor and a drain-source parasitic capacitance of the main transistor.

Optionally, the clamping control circuit comprises a first resistor to set the first threshold, a voltage of the first resistor indicates the oscillation period.

Optionally, the clamping control circuit comprises a comparison circuit to compare the feedback voltage to a first voltage threshold, the first voltage threshold is a zero or a near-zero voltage.

Optionally, the clamping control circuit comprises a timing circuit to start timing when the first transistor is off, and end timing until the feedback voltage is reduced from positive voltage to zero voltage, time elapsed for the timing is the first time.

Optionally, the main transistor is turned on when the feedback voltage oscillates to a valley or near the valley.

According to a second aspect of the disclosure, there is provided a control method for an active clamping flyback circuit, wherein the active clamping flyback circuit comprises a flyback circuit, a clamping circuit and a clamping control circuit, the flyback circuit comprises a transformer, a main transistor, and a freewheeling diode or a synchronous rectifier, an output feedback circuit is coupling to an auxiliary winding of the transformer and outputs a feedback voltage through a divided voltage; the clamping circuit comprises a first capacitor and a first transistor coupling in series, one end of the first capacitor is coupling to a high voltage end of an input voltage, one end of the first transistor is coupling to a common end of the main transistor and a primary winding of the transformer; starting timing when the first transistor is off, and ending timing until the feedback voltage is reduced from a positive voltage to zero voltage, wherein time elapsed for the timing is a first time, and adjusting a turn-off time of next switching cycle of the first transistor so that the first time of the next switching cycle is configured to be substantially the same as a first threshold.

Optionally, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Optionally, the first threshold is set by a first resistor, a voltage of the first resistor indicates the oscillation period.

Optionally, the main transistor is on when the feedback voltage oscillates to a valley or near the valley.

Compared with the prior art, the circuit structure and the driving method of the disclosure has the following advantages: through starting timing from when the first transistor is off until the feedback voltage is reduced from a positive voltage to zero voltage, the time elapsed for timing is adjusted to be configured to be substantially the same as ¼ oscillation period, so that the turn-off time of the first transistor is configured to be substantially the same as a time that current of the primary winding of the transformer is crossing zero, so that reducing system losses due to advanced turn-off or delayed turn-off of the first transistor and improving the system efficiency.

DETAILED DESCRIPTION OF EMBODIMENTS OF THE DISCLOSURE

The preferred embodiments of the disclosure are described in detail below with reference to the drawings, but the disclosure is not limited to the embodiments. The disclosure is intended to cover any alternatives, modifications, equivalent methods and solutions falling within the spirit and scope of the disclosure.

In order to provide the public with a thorough understanding of the disclosure, specific details are described in detail in the following preferred embodiments of the disclosure. The disclosure may also be fully understood by those skilled in the art without a entailed description of these details.

The present disclosure is more specifically described in the following paragraphs by way of example with reference to the accompanying drawings. It should be noted that the drawings are all in a simplified form and both use non-precise proportions, and are only for convenience and clarity to assist the purpose of the embodiments of the disclosure.

Figure 1:
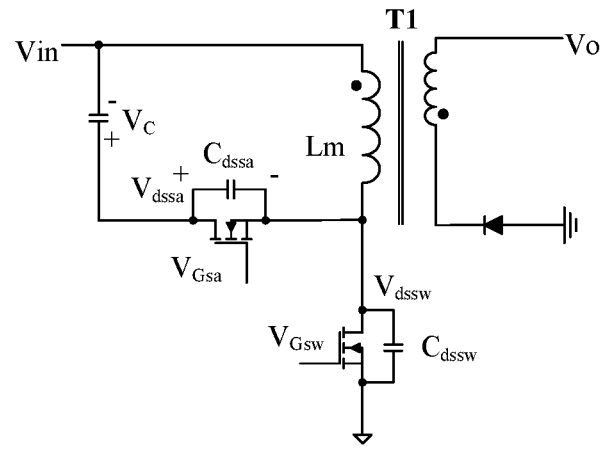
FIG. 1 is a circuit diagram of an active clamping flyback circuit.
Figure 2:
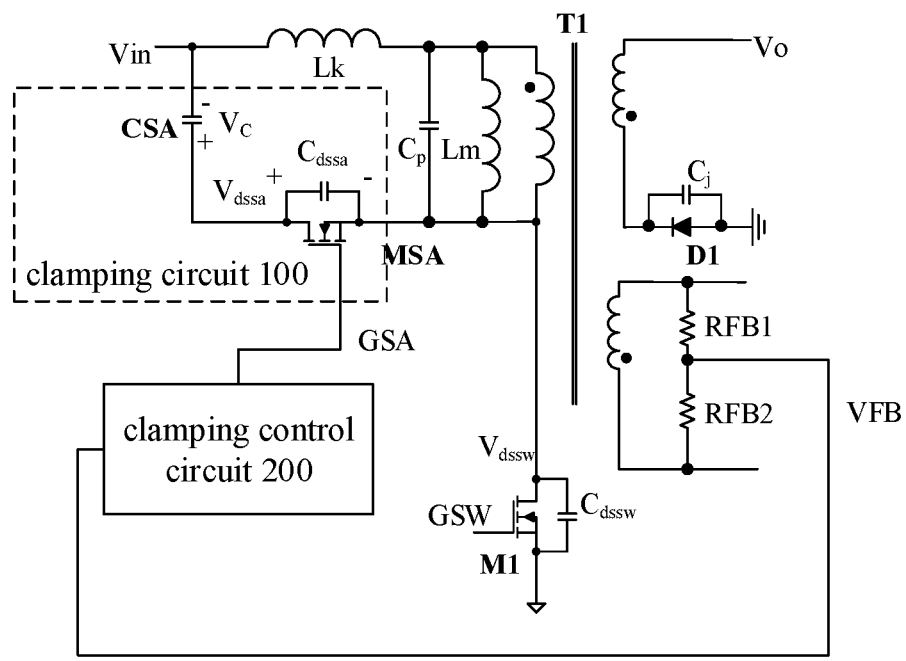
FIG. 2 is a circuit diagram of an active clamping flyback circuit according to an embodiment of the disclosure.

As shown in FIG. 2, an active clamping flyback circuit is provided in the present disclosure, which comprises a flyback circuit, a clamping circuit 100 and a clamping control circuit 200, wherein the flyback circuit comprises a transformer T1, a main transistor M1, and a freewheeling diode or a synchronous rectifier transistor D1, an output feedback circuit is coupling to an auxiliary winding of the transformer and outputs a feedback voltage VFB through a divided voltage, the output feedback circuit is coupling to the clamping control circuit 200; the clamping circuit comprises a first capacitor CSA and a first transistor MSA that are coupling in series, one end of the first capacitor CSA is coupling to a high voltage end of an input voltage Vin, one end of the first transistor MSA is coupling to a common end of the main transistor M1 and a primary winding of the transformer.

When the active clamping flyback circuit operates in a discontinuous conduction mode, the clamping control circuit starts timing when the first transistor MSA is off, and ends timing until the feedback voltage VFB is reduced from a positive voltage to a zero voltage, wherein time elapsed for the timing is a first time, and the clamping control circuit 200 adjusts turn-off time of the next switching cycle of the first transistor so that the first time of the next switching cycle configured to be substantially the same as a first threshold.

It should be noted that in FIG. 2, Lm is an equivalent magnetizing inductance of the transformer, Lk is a leakage inductance of the primary winding of the transformer, and Cp is a parasitic capacitance of the primary winding of the transformer T1; Cdssw is a drain-source parasitic capacitance of the main transistor M1, and Cdssa is a drain-source parasitic capacitance of the first transistor MSA. Voltage of the auxiliary winding is divided by voltage dividing resistors RFB1 and RFB2 to obtain a feedback voltage VFB. In other embodiments, other voltage dividing methods may be used to obtain the feedback voltage. In FIG. 2, the freewheeling diode D1 is employed, and in other embodiments, the synchronous rectifier transistor may also be used for freewheeling.

In an embodiment, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Figure 3:
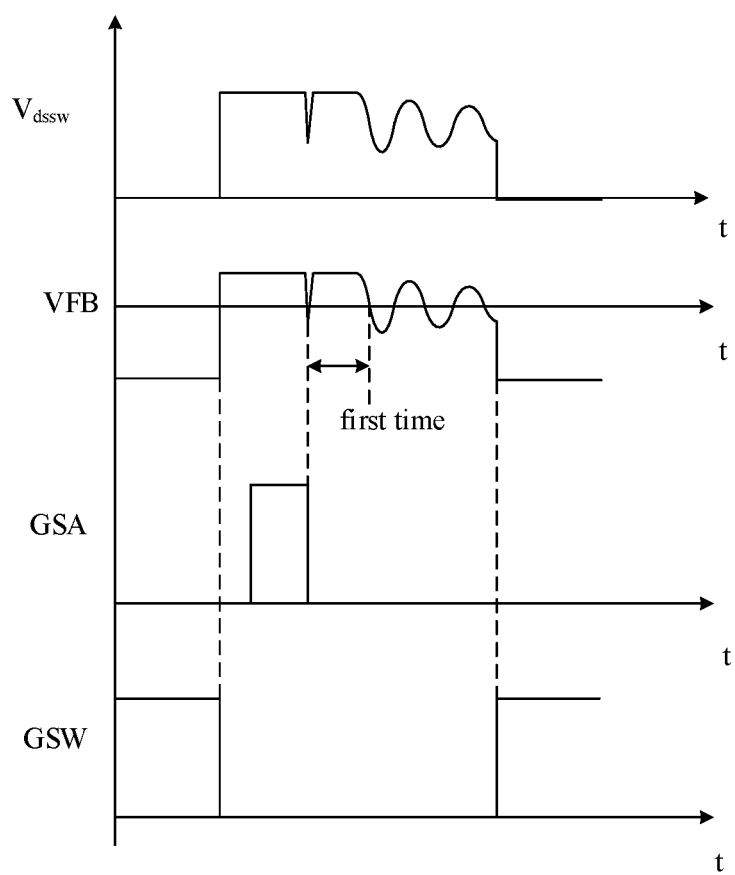
FIG. 3 shows waveforms of a DS voltage of a main transistor, a feedback voltage VFB, a driving voltage GSA of a first transistor, and a driving voltage GSW of the main transistor when the first transistor of the active clamping flyback circuit is off during a first time is greater than ¼ of a oscillation period.

As shown in FIG. 3, waveforms of a DS voltage of a main transistor, the feedback voltage VFB, a driving voltage GSA of the first transistor, and a driving voltage GSW of the main transistor when the first transistor of the active clamping flyback circuit is off during the first time is greater than ¼ of a oscillation period are illustrated; when the first transistor is off during the first time is greater than ¼ of the oscillation period, the DS voltage Vdssw of the main transistor may drop when the first transistor is off, resulting in energy loss, so that system efficiency is reduced. It should be noted that the feedback voltage VFB may cross zero when the above voltage drops, resulting the first time is misjudged. In order to prevent the first time from being misjudged, when the first transistor is off, a period of time is blanked to recover from the voltage drop, and then judge whether the feedback voltage VFB is from positive to negative.

Figure 4:
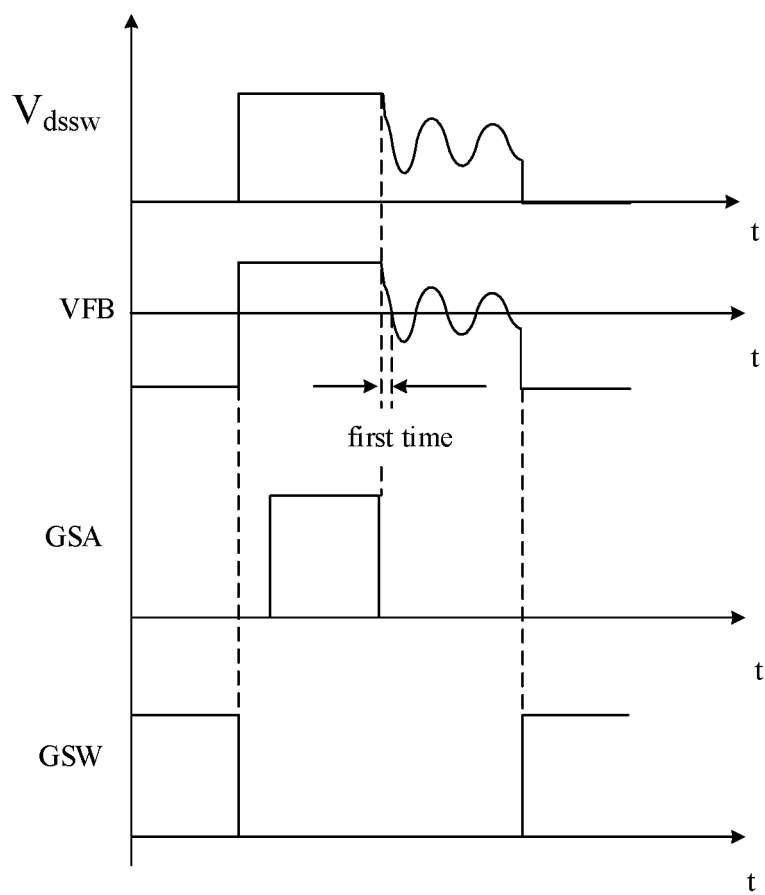
FIG. 4 shows waveforms of a DS voltage of a main transistor, a feedback voltage VFB, a driving voltage GSA of a first transistor, and a driving voltage GSW of the main transistor when the first transistor of the active clamping flyback circuit is off during a first time is smaller than ¼ of a oscillation period.

As shown in FIG. 4, waveforms of a DS voltage of a main transistor, the feedback voltage VFB, the driving voltage GSA of the first transistor, and the driving voltage GSW of the main transistor when the first transistor of the active clamping flyback circuit is off during the first time is smaller than ¼ of a oscillation period are illustrated; when the first transistor is off during the first time is smaller than ¼ of the oscillation period, the DS voltage Vdssw of the main transistor may also drop when the first transistor is off, resulting in energy loss, so that the system efficiency is reduced.

Figure 5:
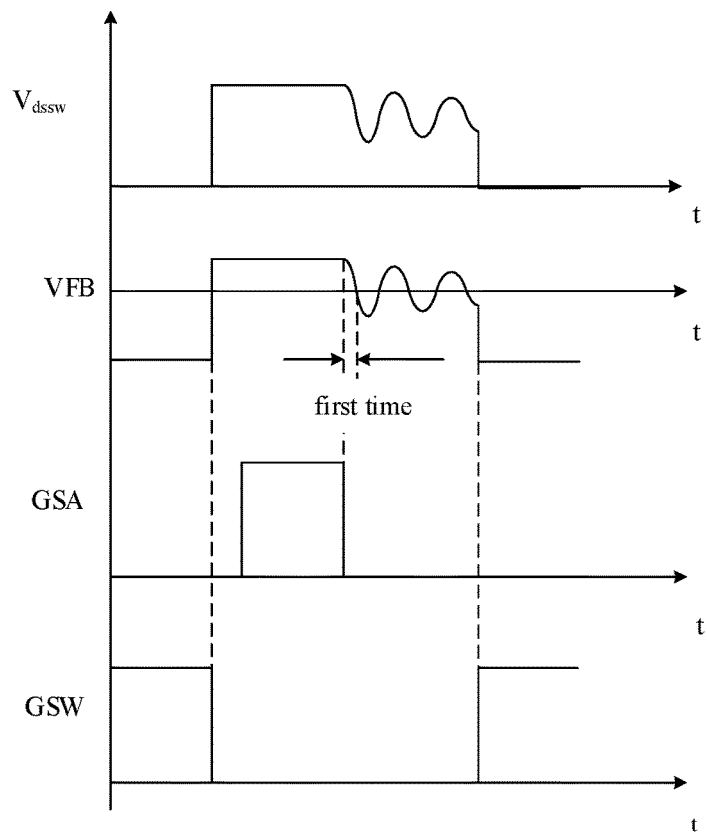
FIG. 5 shows waveforms of a DS voltage of a main transistor, a feedback voltage VFB, a driving voltage GSA of a first transistor, and a driving voltage GSW of the main transistor when the first transistor of the active clamping flyback circuit is off during a first time is equal to ¼ of a oscillation period.

As shown in FIG. 5, waveforms of a DS voltage of a main transistor, the feedback voltage VFB, the driving voltage GSA of the first transistor, and the driving voltage GSW of the main transistor when the first transistor of the active clamping flyback circuit is off during the first time is equal to ¼ of a oscillation period are illustrated; at this time, the voltage Vdssw of the main transistor DS has no voltage drop when the first transistor is off, so that there is no energy loss due to dropping.

In an embodiment, the clamping control circuit comprises a first resistor to set the first threshold, and voltage of the first resistor indicates the oscillation period. When the transformer, the first transistor and the main transistor are determined, the oscillation period generated by the oscillation of a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) is also determined. Therefore, flowing a certain current through the first resistor and adjusting the first resistor so that the voltage of the first resistor changes with the transformer, the first transistor, and the main transistor change, so that the oscillation period is indicated.

Figure 6:
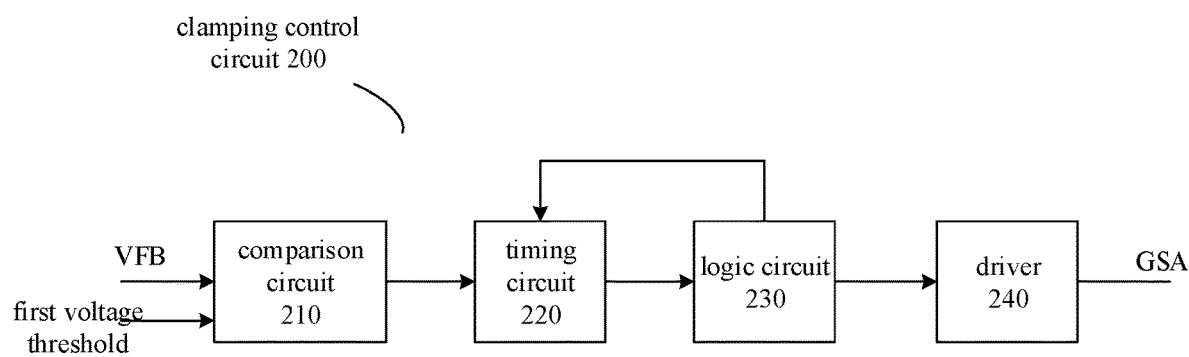
FIG. 6 is an implementation block view of an embodiment of a clamping control circuit.

In an embodiment, as shown in FIG. 6, a block view of an embodiment of the clamping control circuit is illustrated. The clamping control circuit includes a comparison circuit 210, a timing circuit 220, a logic circuit 230, and a driver 240, wherein the comparison circuit compares the feedback voltage VFB with a first voltage threshold, the first voltage threshold is a zero or a near-zero voltage (a voltage substantially the same as zero voltage); the timing circuit receives a turn-off time of the first transistor output by the logic circuit, and starts timing from when the first transistor is off, and receives an output voltage of the comparison circuit, stops timing when the feedback voltage VFB is reduced from a positive voltage to the zero voltage, wherein time elapsed for timing is the first time. The logic circuit 230 receives an output voltage of the timing circuit which indicates the first time, and compares the first time with the first threshold, for delaying the turn-off time of the first transistor in the next switching cycle when the first time is larger than the first threshold and advancing the turn-off time of the first transistor of the next switching cycle when the first time is smaller than the first threshold. The driver 240 receives on and off signals of the first transistor of the logic circuit 230, amplifies the signals, and outputs the driving voltage GSA of the first transistor.

In an embodiment, the main transistor is turned on when the feedback voltage VFB oscillates to a valley or near the valley, so that reducing the turn-on loss of the main transistor.

A control method for an active clamping flyback circuit is further provided, the active clamping flyback circuit comprises a flyback circuit, a clamping circuit and a clamping control circuit, wherein the flyback circuit comprises a transformer, a main transistor, a freewheeling diode or a synchronous rectifier, an output feedback circuit is coupling to an auxiliary winding of the transformer and outputs a feedback voltage through a divided voltage, the output feedback circuit is coupling to the clamping control circuit; the clamping circuit comprises a first capacitor and a first transistor that are coupling in series, one end of the first capacitor is coupling to a high voltage end, one end of the first transistor is coupling to a common end of the main transistor and a primary winding of the transformer.

Starting timing when the first transistor is off, and ending timing until the feedback voltage is reduced from a positive voltage to a zero voltage, wherein time elapsed for the timing is a first time, and adjusting a turn-off time of the next switching cycle of the first transistor so that the first time of the next switching cycle configured to be substantially the same as a first threshold.

Optionally, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Optionally, the first threshold is set by a first resistor, a voltage of the first resistor indicates the oscillation period.

Optionally, the main transistor is turned on when the feedback voltage oscillates to the valley or near the valley.

In addition, although the embodiments are separately illustrated and described above, for a part of the common technology, those skilled in the art can make replacements and integrations between the embodiments, and for the content that is not explicitly described in one embodiment, reference may be made to another embodiment described.

The embodiments described above do not constitute a limitation on the scope of protection of the technical solutions. Modifications, equivalent substitutions, improvements, and the like within the spirit and principles of the above embodiments are intended to be included within the scope of the technical solution.

The invention claimed is:

1. An active clamping flyback circuit, comprising a flyback circuit, a clamping circuit and a clamping control circuit, wherein said flyback circuit comprises a transformer, a main transistor, and a freewheeling diode or a synchronous rectifier, an output feedback circuit is coupling to an auxiliary winding of said transformer and outputs a feedback voltage through a divided voltage; said clamping circuit comprises a first capacitor and a first transistor coupling in series, one end of said first capacitor is coupling to a high voltage end of an input voltage, one end of said first transistor is coupling to a common end of said main transistor and a primary winding of said transformer;

when said active clamping flyback circuit operates in a discontinuous conduction mode, said clamping control circuit starts timing when said first transistor is off, and ends timing until said feedback voltage is reduced from positive voltage to zero voltage, wherein time elapsed for said timing is a first time, and said clamping control circuit adjusts a turn-off time of next switching cycle of said first transistor so that said first time of said next switching cycle is configured to be substantially the same as a first threshold, wherein said first threshold is a quarter of an oscillation period of an oscillation, the oscillation is generated based on a sum inductance of a magnetizing inductance and a leakage inductance of said transformer, and a sum capacitance of a drain-source parasitic capacitance of said first transistor and a drain-source parasitic capacitance of said main transistor.

2. The active clamping flyback circuit of claim 1, wherein wherein said oscillation is a voltage oscillation occurring at a drain terminal of the main transistor after said main transistor is turned off.

3. The active clamping flyback circuit of claim 1, wherein said clamping control circuit comprises a first resistor to set said first threshold, a voltage of said first resistor indicates said oscillation period.

4. The active clamping flyback circuit of claim 1, wherein said clamping control circuit comprises a comparison circuit to compare said feedback voltage to a first voltage threshold, said first voltage threshold is a zero or a near-zero voltage.

5. The active clamping flyback circuit of claim 1, wherein said clamping control circuit comprises:
   a comparison circuit, configured to compares the feedback voltage with a first voltage threshold;
   a timing circuit, configured to obtain said first time according to an output voltage of the comparison circuit, and provide an output voltage that represents said first time;
   a logic circuit, configured to receive the output voltage of the time circuit, and provide on and off signals according to a comparison result between said first time and said first threshold; and
   a driver, configured to turn on/off the first transistor according to the on and off signals.

6. The active clamping flyback circuit of claim 1, wherein said main transistor is turned on when said feedback voltage oscillates to a valley or near said valley.

7. A control method for an active clamping flyback circuit, wherein said active clamping flyback circuit comprises a flyback circuit, a clamping circuit and a clamping control circuit, said flyback circuit comprises a transformer, a main transistor, and a freewheeling diode or a synchronous rectifier, an output feedback circuit is coupling to an auxiliary winding of said transformer and outputs a feedback voltage through a divided voltage; said clamping circuit comprises a first capacitor and a first transistor coupling in series, one end of said first capacitor is coupling to a high voltage end of an input voltage, one end of said first transistor is coupling to a common end of said main transistor and a primary winding of said transformer;
   starting timing when said first transistor is turned off, and ending timing until said feedback voltage is reduced from a positive voltage to a zero voltage, wherein time elapsed for said timing is a first time, and adjusting a turn-off time of next switching cycle of said first transistor so that said first time of said next switching cycle is configured to be substantially the same as a first threshold,
   wherein said first threshold is a quarter of an oscillation period of an oscillation, the oscillation is generated based on a sum inductance of a magnetizing inductance and a leakage inductance of said transformer, and a sum capacitance of a drain-source parasitic capacitance of said first transistor and a drain-source parasitic capacitance of said main transistor.

8. The control method for an active clamping flyback circuit of claim 7, wherein said oscillation is a voltage oscillation occurring at a drain terminal of the main transistor after said main transistor is turned off.

9. The control method for an active clamping flyback circuit of claim 7, wherein said first threshold is set by a first resistor, a voltage of said first resistor indicates said oscillation period.

10. The control method for an active clamping flyback circuit of claim 7, wherein said main transistor is turned on when said feedback voltage oscillates to a valley or near said valley.

\* \* \* \* \*